(12) United States Patent
Shih et al.

(10) Patent No.: US 9,209,542 B1
(45) Date of Patent: Dec. 8, 2015

(54) ELECTRONIC CARD PROTECTING MECHANISM

(71) Applicant: Wistron NeWeb Corp., Hsinchu (TW)

(72) Inventors: Chih-Yung Shih, Hsinchu (TW);
Feng-Ming Chang, Hsinchu (TW);
Yu-Ling Lee, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 0 days.

(21) Appl. No.: 14/452,548

(22) Filed: Aug. 6, 2014

(30) Foreign Application Priority Data

Jun. 17, 2014 (TW) .............................. 103120873 A

(51) Int. Cl.
*H01R 13/44* (2006.01)
*H01R 13/453* (2006.01)
*H01R 12/72* (2011.01)
*H01R 13/52* (2006.01)

(52) U.S. Cl.
CPC ............ *H01R 12/72* (2013.01); *H01R 13/5213* (2013.01)

(58) Field of Classification Search
CPC .. H01R 12/72; H01R 13/5213; H01R 13/447; H01R 13/4534; H01R 13/6397; H01R 24/78; H01R 25/003
USPC .......................................... 439/135, 136, 145
See application file for complete search history.

(56) References Cited

U.S. PATENT DOCUMENTS

| 6,951,469 | B1 * | 10/2005 | Lin ..................... | H01R 13/4538 439/135 |
| 7,083,439 | B1 * | 8/2006 | Hayakawa ........... | H01R 13/443 439/136 |
| 7,189,084 | B2 * | 3/2007 | Iikura .................. | H01R 13/443 439/135 |
| 7,887,344 | B2 * | 2/2011 | Ihara .................... | H04M 1/0274 439/136 |
| 2003/0016492 | A1 * | 1/2003 | Yanagi .................. | G06F 1/1656 361/679.57 |
| 2009/0280664 | A1 * | 11/2009 | Francis ................ | H01R 13/516 439/136 |
| 2010/0087074 | A1 * | 4/2010 | Yu ........................ | G06K 7/0021 439/81 |
| 2010/0210125 | A1 * | 8/2010 | Wu ....................... | H01R 13/447 439/136 |
| 2013/0130523 | A1 * | 5/2013 | Chen .................. | H01R 13/4532 439/136 |
| 2014/0011379 | A1 * | 1/2014 | Yu ........................ | H01R 13/639 439/136 |
| 2014/0134858 | A1 * | 5/2014 | Tseng .................. | H01R 13/447 439/136 |
| 2014/0134859 | A1 * | 5/2014 | Lee ...................... | H01R 13/447 439/136 |
| 2014/0213081 | A1 * | 7/2014 | Wei ..................... | H01R 13/4534 439/136 |

* cited by examiner

*Primary Examiner* — Tulsidas C Patel
*Assistant Examiner* — Peter G Leigh
(74) *Attorney, Agent, or Firm* — Jianq Chyun IP Office

(57) ABSTRACT

An electronic card protecting mechanism is adapted to an electronic device including a casing. The electronic card protecting mechanism includes a base, a substrate, an elastic component and a positioning component. The base is slidably disposed in the casing and has a covering plate having a slot. The substrate is disposed on the base and aligned to the slot. When the base is located at a first position, an opening of the casing is covered by the covering plate. When the base resists an elastic force of the elastic component and moves to a second position, the positioning component positions the base and the opening is aligned to the slot, such that the electronic card is adapted to be plugged to or unplugged from the substrate through the opening. When the base is released by the positioning component, the base is restored by the elastic force of the elastic component.

10 Claims, 5 Drawing Sheets

ELECTRONIC CARD PROTECTING MECHANISM

CROSS-REFERENCE TO RELATED APPLICATION

This application claims the priority benefit of Taiwan application serial no. 103120873, filed on Jun. 17, 2014. The entirety of the above-mentioned patent application is hereby incorporated by reference herein and made a part of this specification.

BACKGROUND OF THE INVENTION

1. Field of the Invention

The invention relates to a protecting mechanism, and particularly relates to an electronic card protecting mechanism.

2. Description of Related Art

Due to the pervasiveness of mobile network and the popularity of electronic devices, such as smart phones and tablet PCs, that capable of accessing the mobile network, wireless network sharing devices adapted for sharing mobile network signals are consequently developed. In the wireless network sharing device, a SIM card having a mobile network capability is installed to simultaneously share the mobile network signals to a plurality of electronic devices.

Generally speaking, the casing of the wireless network sharing device has an opening to plug and unplug the SIM card. However, under the circumstance that the wireless network sharing device does not support hot swapping of the SIM card, the SIM card may be damaged if the user erroneously removes the SIM card exposed by the opening when the wireless network sharing device is functioning. Thus, how to protect the SIM card installed in the wireless network sharing device and prevent the user from erroneously removing the SIM card from the wireless network sharing device has become an important design issue.

SUMMARY OF THE INVENTION

The invention provides an electronic card protecting mechanism capable of protecting an electronic card in an electronic device and preventing the user from erroneously removing the electronic card from the electronic device.

The electronic card protecting device is adapted for an electronic device. The electronic device includes a casing, and the casing has an opening. The electronic card protecting mechanism includes a base, a substrate, an elastic component, and a positioning component. The base is slidably disposed inside the casing and has a covering plate, and the covering plate has a slot. The substrate is disposed on the base and aligned to the slot. When the base is located at a first position, the opening is misaligned from the slot and covered by the covering plate to prevent an electronic card from being plugged to and unplugged from the substrate through the opening. The elastic component is connected between the base and the casing. When the base resists an elastic force of the elastic component and moves from the first position to a second position, the opening is aligned with the slot, such that the electronic card is adapted to be plugged to or unplugged from the substrate through the opening. The positioning component is connected to the casing and adapted to position the base at the second position. When the positioning component releases the base, the base is restored to the first position by the elastic force of the elastic component.

According to an embodiment of the invention, the electronic card protecting mechanism further includes a flexible printed circuit (FPC), wherein the electronic device includes a main board, the main board is disposed inside the casing, and the flexible printed circuit is connected between the substrate and the main board.

According to an embodiment of the invention, the base is adapted to resist the elastic force of the elastic component and move from the first position to the second position along a first direction, and the base located at the second position is adapted to resist the elastic force of the elastic component and move along the first direction to be released by the positioning component, and then the base is restored to the first position by the elastic force of the elastic component along a second direction opposite to the first direction.

According to an embodiment of the invention, the positioning component has two convex parts, a positioning indentation is formed between the two convex parts, and an edge of the base is adapted to be positioned at the positioning indentation.

According to an embodiment of the invention, the positioning component is an elastic arm, the edge of the base is adapted to push one of the convex parts to elastically deform the elastic arm, and the edge is engaged into or moved away from the positioning indentation through elastic deformation of the elastic arm.

According to an embodiment of the invention, at least one of the convex parts has a guiding surface, and the edge of the base is adapted to push the corresponding convex part and move relative to the corresponding convex part through guiding of the guiding surface.

According to an embodiment of the invention, the edge of the base has a guiding surface, and the edge is adapted to push each of the convex parts and move relative to each of the convex parts through guiding of the guiding surface.

According to an embodiment of the invention, the base has a pressing part, the casing has a hole exposing the pressing part, and the pressing part is adapted to be pressed to drive the base to move inside the casing.

According to an embodiment of the invention, the pressing part has a protruding edge, a stopping part is disposed inside the casing, and the elastic component is disposed between the protruding edge and the stopping part.

According to an embodiment of the invention, at least one column is disposed inside the casing, the base has at least one slide aperture, and the base is disposed at the column by using the slide aperture.

Based on the above, the base of the electronic card protecting mechanism according to the embodiments of the invention is capable of moving inside the casing of the electronic device and making the covering plate cover the opening of the casing. Thus, the user may be prevented from erroneously removing the electronic card on the base through the opening when the electronic device is operating, thus damaging the electronic card. When it is intended to install, test, change, or remove the electronic card, the base may be moved to make the slot on the covering plate aligned to the opening of the casing, so that the electronic card may be plugged or unplugged through the opening. Accordingly, the electronic card protecting mechanism according to the embodiments of the invention is capable of effectively protecting the electronic card inside the electronic device without influencing the convenience of installing, testing, changing, or removing the electronic card.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
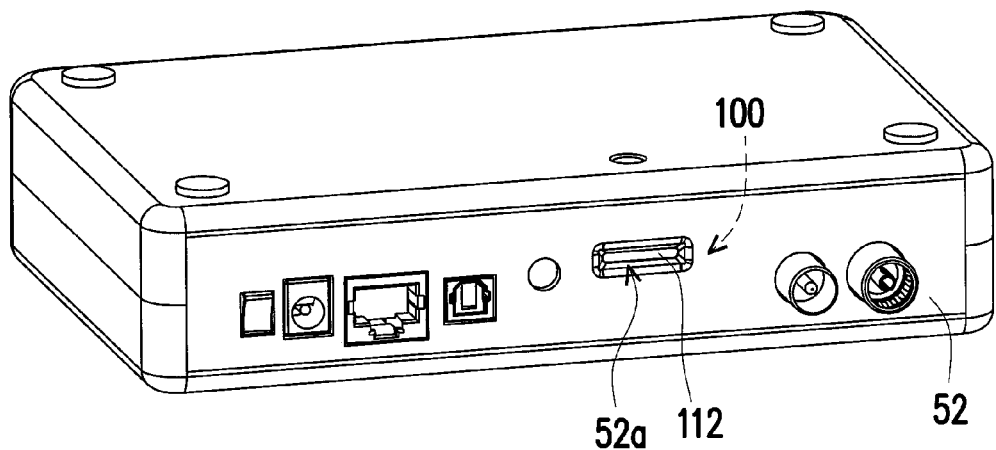
FIG. 1A is a perspective view illustrating an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
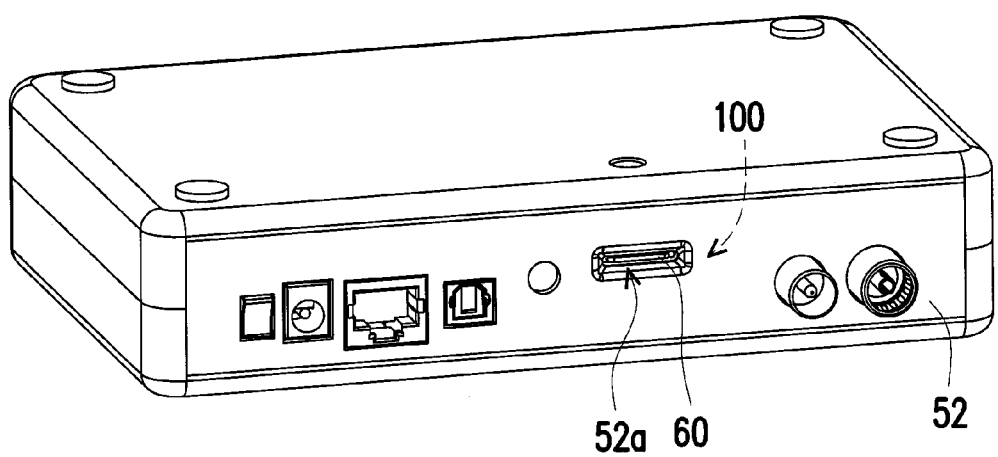
FIG. 1B is a diagram illustrating an electronic card inside a casing exposed by an opening shown in FIG. 1A.

FIG. 1A is a perspective view illustrating an electronic device according to an embodiment of the invention. FIG. 1B is a diagram illustrating an electronic card inside a casing exposed by an opening shown in FIG. 1A. Referring to FIGS. 1A and 1B, an electronic device 50 of this embodiment is a wireless network sharing device, for example, and includes a casing 52. The casing 52 has an opening 52a. An electronic card protecting mechanism 100 is disposed inside the casing 52. An electronic card 60 (shown in FIG. 2, such as a SIM card, for example) installed inside the casing 52 may be hidden, as shown in FIG. 1A, or exposed by the opening 52a of the casing 52, as shown in FIG. 1B, through an operation of the electronic card protecting mechanism 100. Details regarding a specific structure and operation of the electronic card protecting mechanism 100 are provided in the following.

Figure 2:
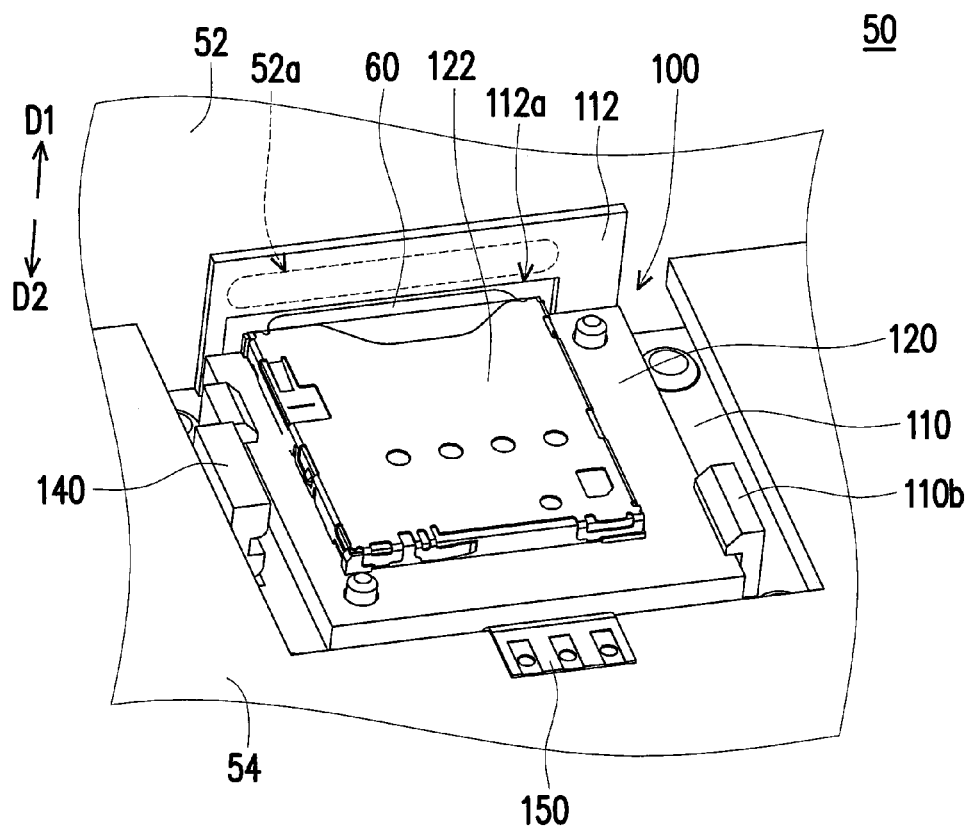
FIG. 2 is a perspective view illustrating part of components of the electronic device shown in FIG. 1 from another view angle.

FIG. 2 is a perspective view illustrating part of components of the electronic device shown in FIG. 1 from another view angle. Referring to FIG. 2, the electronic device 50 includes a main board 54. The main board 54 is disposed inside the casing 52. The electronic card protecting mechanism 100 includes a case 110 and a substrate 120. The substrate 120 is electrically connected with the main board 54, and a plug part 122 on the substrate 120 is configured to insert the electronic card 60. The base 110 is slidably disposed inside the casing 52 along a first direction D1 and a second direction D2 and has a covering plate 112. The covering plate 112 has a slot 112a. The substrate 120 is disposed on the base 110 and aligned to the slot 112a of the covering plate 112. The substrate 120 is fixed to the base 110 by a hook 110b on the base 110, for example, or by other suitable structures. The invention is not limited thereto.

Figure 3A:
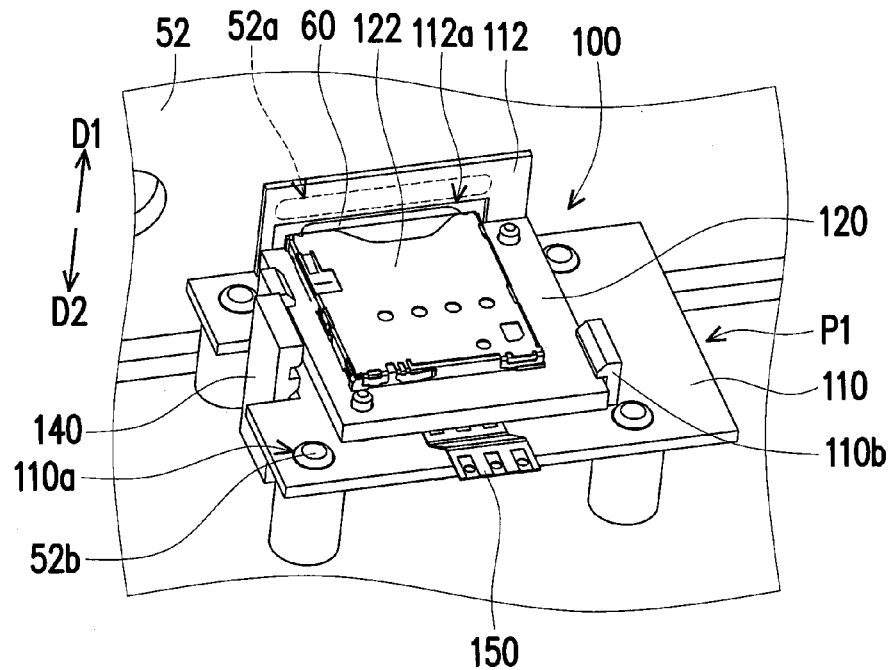
FIG. 3A is a perspective view illustrating part of components of the electronic device shown in FIG. 2.
Figure 3B:
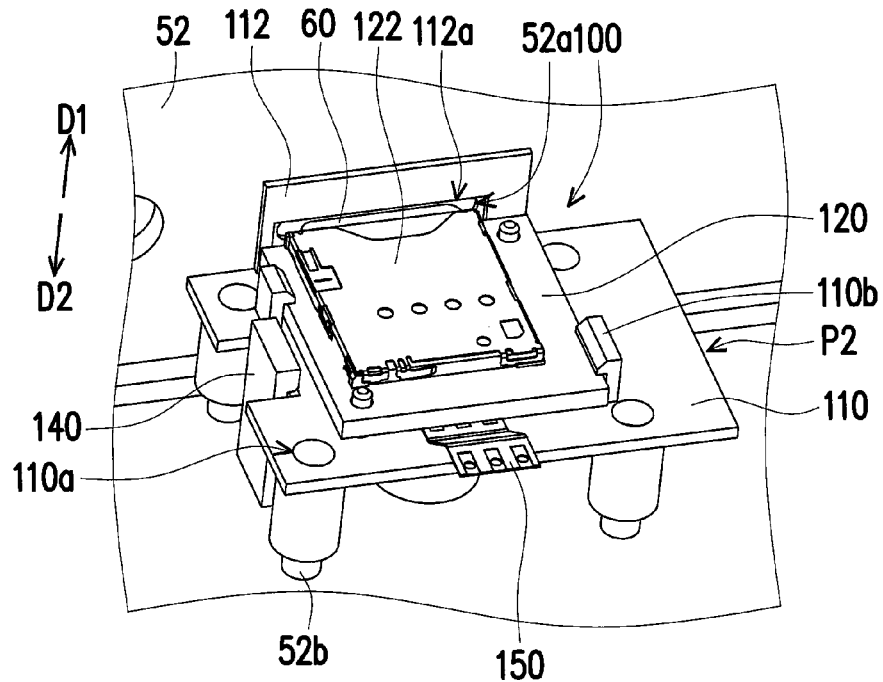
FIG. 3B is a diagram illustrating a base shown in FIG. 3A moving from a first position to a second position.
Figure 4A:
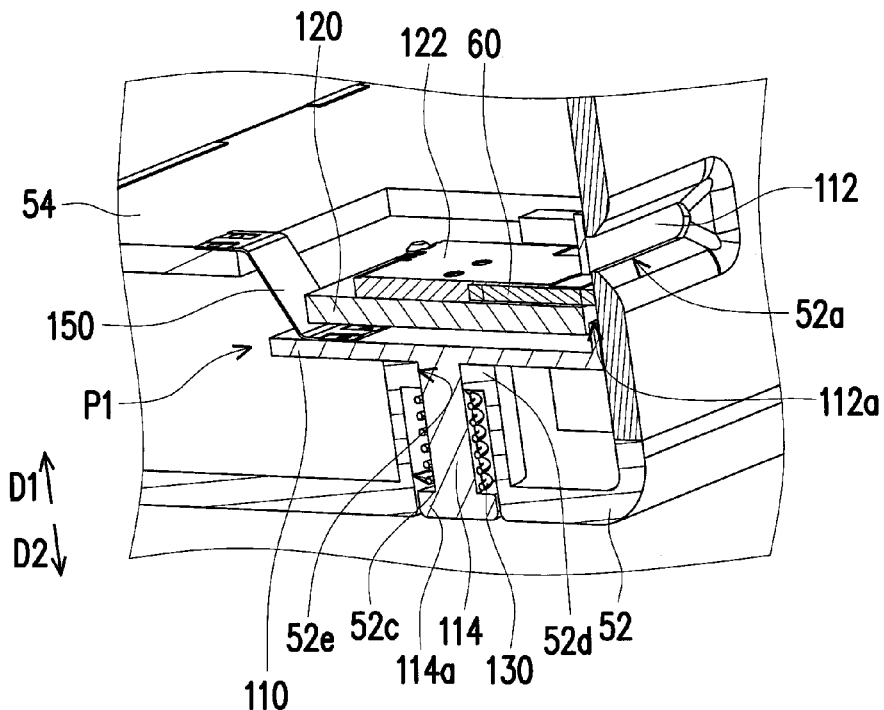
FIG. 4A is a partial structural perspective view of the electronic device shown in FIG. 1.
Figure 4B:
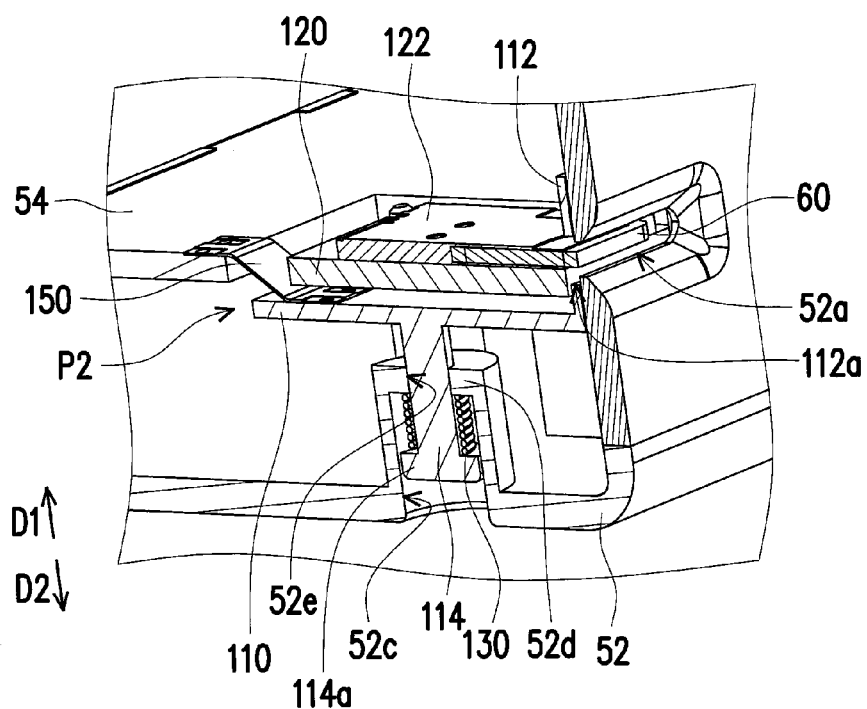
FIG. 4B is a diagram illustrating a base shown in FIG. 4A moving from a first position to a second position.

FIG. 3A is a perspective view illustrating part of components of the electronic device shown in FIG. 2. FIG. 3B is a diagram illustrating a base shown in FIG. 3A moving from a first position to a second position. FIG. 4A is a partial structural perspective view of the electronic device shown in FIG. 1. FIG. 4B is a diagram illustrating a base shown in FIG. 4A moving from a first position to a second position. When the base 110 is located at a first position P1 as shown in FIGS. 3A and 4A, the opening 52a of the casing 52 is misaligned from the slot 112a of the covering plate 112 and is covered by the covering plate 112, thereby preventing the electronic card 60 from being plugged to or unplugged from the plug part 112 of the substrate 120 through the opening 52a.

As shown in FIGS. 4A and 4B, the electronic card protecting mechanism 100 further includes an elastic component 130, and further includes a positioning component 140 as shown in FIGS. 3A and 3B. The elastic component 130 is a compression spring, for example, and connected between the base 110 and the casing 52. The positioning component 130 is integrally formed, and is connected to the casing 52. The base 110 is adapted to be maintained at the first position P1 shown in FIGS. 3A and 4A by an elastic force of the elastic component 130. When the base 110 resists the elastic force of the elastic component 130 and moves upward from the first position P1 shown in FIGS. 3A and 4A to a second position P2 shown in FIGS. 3B and 4B, the elastic component 130 is compressed, and the positioning component 140 positions the base 110 at the second position P2, as shown in FIG. 3B. In addition, the opening 52a of the casing 52 is aligned to the slot 112a of the covering plate 112, such that the electronic card 60 is exposed by the opening 52a as shown in FIGS. 1B, 3B, and 4B and is adapted to be plugged to or unplugged from the plug part 122 on the substrate 120 through the opening 52a.

With the configuration and operation, the base 110 of the electronic card protecting mechanism 100 is capable of moving inside the casing 52 of the electronic device 50 to make the covering plate 112 of the base 110 cover the opening 52a of the casing 52. Thus, the user may be prevented from erroneously removing the electronic card 60 on the base 110 and thus damaging the electronic card 60 through the opening 52a when the electronic device 50 is operating. When it is intended to install, test, change, or remove the electronic card 60, the base 110 may be moved to make the slot 112a on the covering plate 112 aligned to the opening 52a of the casing 52, so that the electronic card 60 may be plugged or unplugged through the opening 52a. Accordingly, the electronic card protecting mechanism 100 of this embodiment is capable of effectively protecting the electronic card 60 in the electronic device 50 without influence the convenience of installing, testing, changing or removing the electronic card 60.

Figure 5:
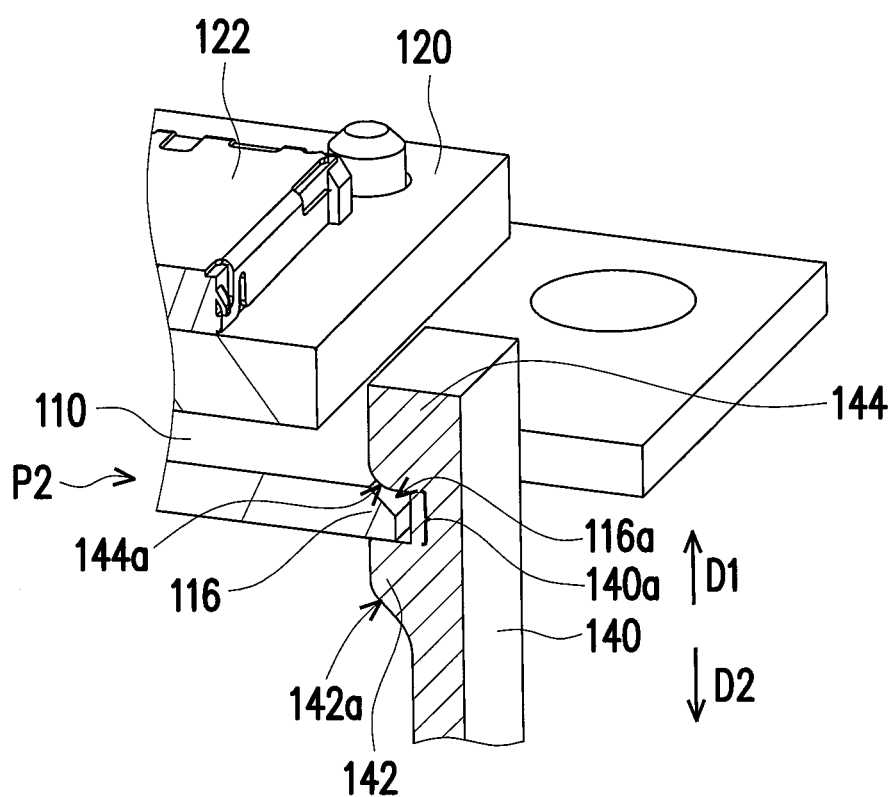
FIG. 5 is a partial structural perspective view of an electronic card protecting mechanism shown in FIG. 3B.

FIG. 5 is a partial structural perspective view of an electronic card protecting mechanism shown in FIG. 3B. Referring to FIG. 5, the positioning component 140 of this embodiment is an elastic arm and has convex parts 142 and 144. A positioning indentation 140a is formed between the convex parts 142 and 144. An edge 116 of the base 110 is adapted to be engaged into or moved away from the positioning indentation 140a through elastic deformation of the elastic arm. When the base 110 is at the second position P2 shown in FIGS. 3B, 4B, and 5, the edge 116 of the base 110 is positioned at the positioning indentation 140a to prevent the base 110 from being restored to the first position P1 due to the elastic force of the elastic component 130 shown in FIG. 4B. When the positioning component 140 releases the base 110, the base 110 may be restored to the position P1 shown in FIGS. 3A and 4A by the elastic force of the elastic component 130.

More specifically, the base 110 of this embodiment has a pressing part 114, as shown in FIGS. 4A and 4B, and the casing 52 has a hole 52c exposing the pressing part 114. The pressing part 114 is adapted to be pressed to drive the base 110 to move inside the casing 52. When the base 110 is located at the first position P1 shown in FIG. 4A, the pressing part 114 is adapted to be pressed along the first direction D1 to drive the base 110 to resist the elastic force of the elastic component 130 and move from the first position P1 to the second position P2 shown in FIG. 4B along the first direction D1. During this process, the edge 116 of the base 110 pushes the convex part 142 to elastically deform the elastic arm, such that the edge 116 of the base 110 is smoothly engaged into the positioning indentation 140a through elastic deformation of the elastic arm. The base 110 is thus positioned by the positioning component 140.

When the base 110 is located at the second position P2 shown in FIG. 4B, the pressing part 114 is adapted to be pressed along the first direction D1 to drive the base 110 to resist the elastic force of the elastic component 130 and push the convex part 144 along the first direction D1, such that the elastic arm is elastically deformed. The edge 116 of the base 110 is then moved away from the second position P2 (i.e. moved away from the positioning indentation 140a) along the first direction D1 through the elastic deformation of the elastic arm, making the base 110 released by the positioning component 140. Then, the base 110 may be restored to the first position P1 shown in FIG. 4A along a second direction D2 opposite to the first direction D1 by the elastic force of the elastic component 130. During this process, the base 110 rapidly moves across the positioning indentation 140a along the second direction D2 by using the elastic force of the elastic component 130, for example, without being engaged into the positioning indentation 140a unexpectedly.

Referring to FIG. 2, in this embodiment, the electronic card protecting mechanism 100 further includes a flexible printed circuit 150. The flexible printed circuit 150 is connected between the substrate 120 and the main board 54. When the base 110 carrying the substrate 120 moves between the first position P1 shown in FIGS. 3A and 4A and the second position P2 shown in FIGS. 3B and 4B, the flexible printed circuit 150 is correspondingly bent due to its flexibility, thereby maintaining electrical connection between the substrate 120 and the main board 54.

Referring to FIGS. 3A and 3B, in this embodiment, at least one column 52b (illustrated to have four columns) is disposed inside the casing 52. The base 110 has at least one slide aperture 110a (illustrated to have four slide apertures), and is slidably disposed at the columns 52b by using the slide apertures 110a. In other embodiments, the base 110 may be slidably disposed inside the casing 52 by using other suitable structures. The invention is not limited thereto.

Referring to FIGS. 4A and 4B, in this embodiment, the pressing part 114 has a protruding edge 114a, and a stopping part 52d is disposed inside the casing 52. The elastic component 130 is disposed between the protruding edge 114a of the pressing part 114 and the stopping part 52d of the casing 52, so as to be compressed as the base 110 and the pressing part 114 thereof move along the first direction D1. Moreover, the casing 52 has a slide aperture 52e located at the stopping part 52d to slidably dispose the pressing part 114 along the first direction D1.

Referring to FIG. 5, in this embodiment, the convex part 142 has a guiding surface 142a, and the convex part 144 has a guiding surface 144a. In addition, the edge 116 of the base 110 has a guiding surface 116a. The edge 116 of the base 110 is adapted to push the convex part 142 and move relative to the convex part 142 through guiding of the guiding surface 116a and the guiding surface 142a. In addition, the edge 116 of the base 110 is adapted to push the convex part 144 and move relative to the convex part 144 through guiding of the guiding surface 116a and the guiding surface 144a. The guiding surface may be a guiding curved plane, a guiding inclined plane, or guiding surfaces in other suitable forms. The invention is not limited thereto.

In view of the foregoing, the base of the electronic card protecting mechanism according to the embodiments of the invention is capable of being maintained at the first position inside the casing of the electronic device by the elastic force of the elastic component, making the covering plate cover the opening of the casing. Thus, the user may be prevented from erroneously removing the electronic card on the base through the opening when the electronic device is operating, thus damaging the electronic card. When the electronic card is intended to be installed, tested, changed, or removed, the elastic force of the elastic component may be resisted, and the base is moved to the second position, such that the slot on the covering plate is aligned to the opening of the casing, and the base is positioned at the second position by the positioning component. In this way, the electronic card may be plugged or unplugged through the opening. Accordingly, the electronic card protecting mechanism according to the embodiments of the invention is capable of effectively protecting the electronic card inside the electronic device without influencing the convenience of installing, testing, changing, or removing the electronic card.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic card protecting mechanism adapted for an electronic device, wherein the electronic device comprises a casing, and the casing has an opening, the electronic card protecting mechanism comprising:
    a base, slidably disposed inside the casing and has a covering plate, wherein the covering plate has a slot;
    a substrate, disposed on the base and aligned to the slot, wherein when the base is located at a first position, the opening is misaligned from the slot and covered by the covering plate to prevent an electronic card from being plugged to and unplugged from the substrate through the opening;
    an elastic component, connected between the base and the casing, wherein when the base resists an elastic force of the elastic component and moves from the first position to a second position, the opening is aligned with the slot, such that the electronic card is adapted to be plugged to or unplugged from the substrate through the opening; and
    a positioning component, connected to the casing and adapted to position the base at the second position, wherein when the positioning component releases the base, the base is restored to the first position by the elastic force of the elastic component.

2. The electronic card protecting mechanism as claimed in claim 1, further comprising a flexible printed circuit, wherein the electronic device comprises a main board, the main board is disposed inside the casing, and the flexible printed circuit is connected between the substrate and the main board.

3. The electronic card protecting mechanism as claimed in claim 1, wherein the base is adapted to resist the elastic force of the elastic component and move from the first position to the second position along a first direction, the base located at the second position is adapted to resist the elastic force of the elastic component and move along the first direction to be released by the positioning component, and then the base is restored to the first position by the elastic force of the elastic component along a second direction opposite to the first direction.

4. The electronic card protecting mechanism as claimed in claim 1, wherein the positioning component has two convex parts, a positioning indentation is formed between the two convex parts, and an edge of the base is adapted to be positioned at the positioning indentation.

5. The electronic card protecting mechanism as claimed in claim 4, wherein the positioning component is an elastic arm, the edge of the base is adapted to push one of the convex parts to elastically deform the elastic arm, and the edge is engaged into or moved away from the positioning indentation through elastic deformation of the elastic arm.

6. The electronic card protecting mechanism as claimed in claim 4, wherein at least one of the convex parts has a guiding surface, and the edge of the base is adapted to push the corresponding convex part and move relative to the corresponding convex part through guiding of the guiding surface.

7. The electronic card protecting mechanism as claimed in claim 4, wherein the edge of the base has a guiding surface, and the edge is adapted to push each of the convex parts and move relative to each of the convex parts through guiding of the guiding surface.

8. The electronic card protecting mechanism as claimed in claim 1, wherein the base has a pressing part, the casing has a hole exposing the pressing part, and the pressing part is adapted to be pressed to drive the base to move inside the casing.

9. The electronic card protecting mechanism as claimed in claim 8, wherein the pressing part has a protruding edge, a stopping part is disposed inside the casing, and the elastic component is disposed between the protruding edge and the stopping part.

10. The electronic card protecting mechanism as claimed in claim 1, wherein at least one column is disposed inside the casing, the base has at least one slide aperture, and the base is disposed at the column by using the slide aperture.

\* \* \* \* \*